(12) United States Patent
Owaki (10) Patent No.: US 12,077,104 B2
(45) Date of Patent: Sep. 3, 2024

(54) CAMERA MODULE

(71) Applicant: Sony Semiconductor Solutions Corporation, Kanagawa (JP)

(72) Inventor: Hirofumi Owaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 139 days.

(21) Appl. No.: 17/799,244

(22) PCT Filed: Feb. 10, 2021

(86) PCT No.: PCT/JP2021/004981
§ 371 (c)(1),
(2) Date: Aug. 11, 2022

(87) PCT Pub. No.: WO2021/166764
PCT Pub. Date: Aug. 26, 2021

(65) Prior Publication Data
US 2023/0080778 A1 Mar. 16, 2023

(30) Foreign Application Priority Data

Feb. 19, 2020 (JP) .................. 2020-026042

(51) Int. Cl.
*B60R 11/04* (2006.01)
*G03B 17/02* (2021.01)
(Continued)

(52) U.S. Cl.
CPC .............. *B60R 11/04* (2013.01); *G03B 17/02* (2013.01); *H04N 23/51* (2023.01); *H04N 23/54* (2023.01); *H04N 23/57* (2023.01)

(58) Field of Classification Search
None
See application file for complete search history.

(56) References Cited

U.S. PATENT DOCUMENTS

| 2011/0199485 A1 | 8/2011 | Nakamura |
| 2019/0174623 A1 | 6/2019 | Owaki |

(Continued)

FOREIGN PATENT DOCUMENTS

| JP | 2001-267594 A | 9/2001 |
| JP | 2007-028430 A | 2/2007 |

(Continued)

OTHER PUBLICATIONS

International Search Report and English translation thereof mailed Apr. 27, 2021 in connection with International Application No. PCT/JP2021/004981.

(Continued)

*Primary Examiner* — Mark T Monk
(74) *Attorney, Agent, or Firm* — Wolf, Greenfield & Sacks, P.C.

(57) ABSTRACT

A camera module includes a housing, a barrel member, a sensor board, and a metallic shield case. The housing includes a first case that includes an opening, and a second case that is joined to the first case. The barrel member is arranged in the first case, and includes a barrel that is fitted into the opening in an optical-axis direction. The sensor board is arranged in the housing and includes an imaging device that faces the barrel member. The shield case is arranged between the barrel member and the second case.

10 Claims, 6 Drawing Sheets

(51) Int. Cl.
*H04N 23/51* (2023.01)
*H04N 23/54* (2023.01)
*H04N 23/57* (2023.01)

(56) References Cited

U.S. PATENT DOCUMENTS

| | | |
|---|---|---|
| 2020/0057357 A1 | 2/2020 | Nakamura |
| 2020/0195822 A1 | 6/2020 | Agawa et al. |

FOREIGN PATENT DOCUMENTS

| | | |
|---|---|---|
| JP | 2011-166012 A | 8/2011 |
| JP | 5413231 B2 | 2/2014 |
| JP | 2018-164189 A | 10/2018 |
| JP | 2018-173434 A | 11/2018 |
| WO | WO-2018174301 A1 | 9/2018 |
| WO | WO 2018/181890 A1 | 10/2018 |
| WO | WO 2018/221210 A1 | 12/2018 |

OTHER PUBLICATIONS

International Written Opinion and English translation thereof mailed Apr. 27, 2021 in connection with International Application No. PCT/JP2021/004981.
International Preliminary Report on Patentability and English translation thereof mailed Sep. 1, 2022 in connection with International Application No. PCT/JP2021/004981.
Extended European Search Report issued Feb. 10, 2023 in connection with European Application No. 21756988.8.

CAMERA MODULE

CROSS-REFERENCE TO RELATED APPLICATIONS

This application claims the benefit under 35 U.S.C. § 371 as a U.S. National Stage Entry of International Application No. PCT/JP2021/004981, filed in the Japanese Patent Office as a Receiving Office on Feb. 10, 2021, which claims priority to Japanese Patent Application Number JP2020-026042, filed in the Japanese Patent Office on Feb. 19, 2020, each of which is hereby incorporated by reference in its entirety.

TECHNICAL FIELD

The present technology relates to a camera module mounted on, for example, a vehicle.

BACKGROUND ART

A camera apparatus that is mounted on a vehicle and used to perform visual recognition using a monitor apparatus placed near a cockpit has been provided in the past, in order to improve the convenience and the safety for the vehicle. This type of camera apparatus includes a substantially rectangular housing into which, for example, an imaging lens, an imaging device, and an external connector are incorporated, and the housing is built in or attached to, for example, a rear door, a sideview mirror, or a front spoiler of a vehicle body such that the imaging lens faces the outside. Such a camera apparatus makes it possible to capture an image of surroundings of a vehicle that are a blind spot as viewed from a driver, and thus to improve the safety and the convenience.

For example, Patent Literature 1 discloses, as this type of camera apparatus, an apparatus that includes a housing formed by a front case and a rear case being joined to each other; a board that includes an imaging device arranged in the housing, a barrel member that is arranged between the imaging device and the front case, and a shield case that surrounds the board, the barrel member being fixed in the housing using a spring force of the shield case.

CITATION LIST

Patent Literature

Patent Literature 1: Japanese Patent No. 5413231

DISCLOSURE OF INVENTION

Technical Problem

In this type of camera module, a barrel of the barrel member is configured to be exposed to the outside through an opening formed in a front surface portion of the front case. Thus, when a large external force acts on the barrel, the shield case may be deformed beyond its elastic limit. This may result in a reduction in the accuracy in the position of the barrel member in the housing, and thus in a significant reduction in the quality of a camera image.

In view of the circumstances described above, it is an object of the present technology to provide a camera module that makes it possible to improve the durability for an external force that acts on the barrel, and thus to prevent a reduction in the image quality.

Solution to Problem

A camera module according to an embodiment of the present technology includes a housing, a barrel member, a sensor board, and a metallic shield case.

The housing includes a first case that includes an opening, and a second case that is joined to the first case.

The barrel member is arranged in the housing, and includes a barrel that is fitted into the opening in an optical-axis direction.

The sensor board is arranged in the housing and includes an imaging device that faces the barrel member.

The shield case is arranged between the barrel member and the second case. The shield case includes a peripheral wall portion that covers around the sensor element, and an elastic part that is provided to an end of the peripheral wall portion and biases the barrel member toward the opening. The elastic part includes a control portion that controls approach of the barrel member to the second case such that the barrel member is at a distance greater than or equal to a specified distance from the second case.

The elastic part may have an arch shape formed by the elastic part being bent in stages inward of the shield case from the end of the peripheral wall portion. In this case, the control portion is a tip or a base end of the arch shape.

The control portion may be the tip of the arch shape. In this case, the elastic part is provided to the end of the peripheral wall portion, which is situated on a side of the barrel member. The elastic part is elastically deformable in a state between a first state in which an apex of the arch shape is brought into contact with the barrel member, and a second state in which the tip and the apex of the arch shape are brought into contact with the barrel member, and, in the second state, the elastic part controls the approach of the barrel member to the second case such that the barrel member is at the distance greater than or equal to the specified distance from the second case.

In this case, the barrel member may further include a flange with which the elastic part is brought into contact, and a leg portion that extends toward the sensor board from the flange. In the second state, the tip of the arch shape of the elastic part is brought into contact with the leg portion.

On the other hand, the control portion may be the base end of the arch shape. In this case, the elastic part is provided to the end of the peripheral wall portion, which is situated on a side of the second case. The elastic part is elastically deformable in a state between a first state in which the tip and an apex of the arch shape are brought into contact with the second case, and a second state in which the tip, the apex, and the base end of the arch shape are brought into contact with the second case, and, in the second state, the elastic part controls the approach of the barrel member to the second case such that the barrel member is at the distance greater than or equal to the specified distance from the second case.

In this case, the second case may include a bottom surface portion, and a protrusion that extends toward the sensor board from the bottom surface portion. In the first state, the tip and the apex of the arch shape of the elastic part are respectively brought into elastic contact with a lateral surface of the protrusion and the bottom surface portion, and, in the second state, the base end of the arch shape of the elastic part is brought into contact with the bottom surface portion.

The elastic part may be provided to a plurality of locations at the end of the peripheral wall portion.

In this case, the elastic part may be provided to locations that are included in the plurality of locations at the end of the peripheral wall portion and situated across the sensor board from each other.

The camera module may further include an external connector. The external connector is provided to the second case and electrically connected to the sensor board.

The camera module may be attachable to a vehicle.

MODE(S) FOR CARRYING OUT THE INVENTION

Embodiments according to the present technology will now be described below with reference to the drawings.

First Embodiment

Figure 1:
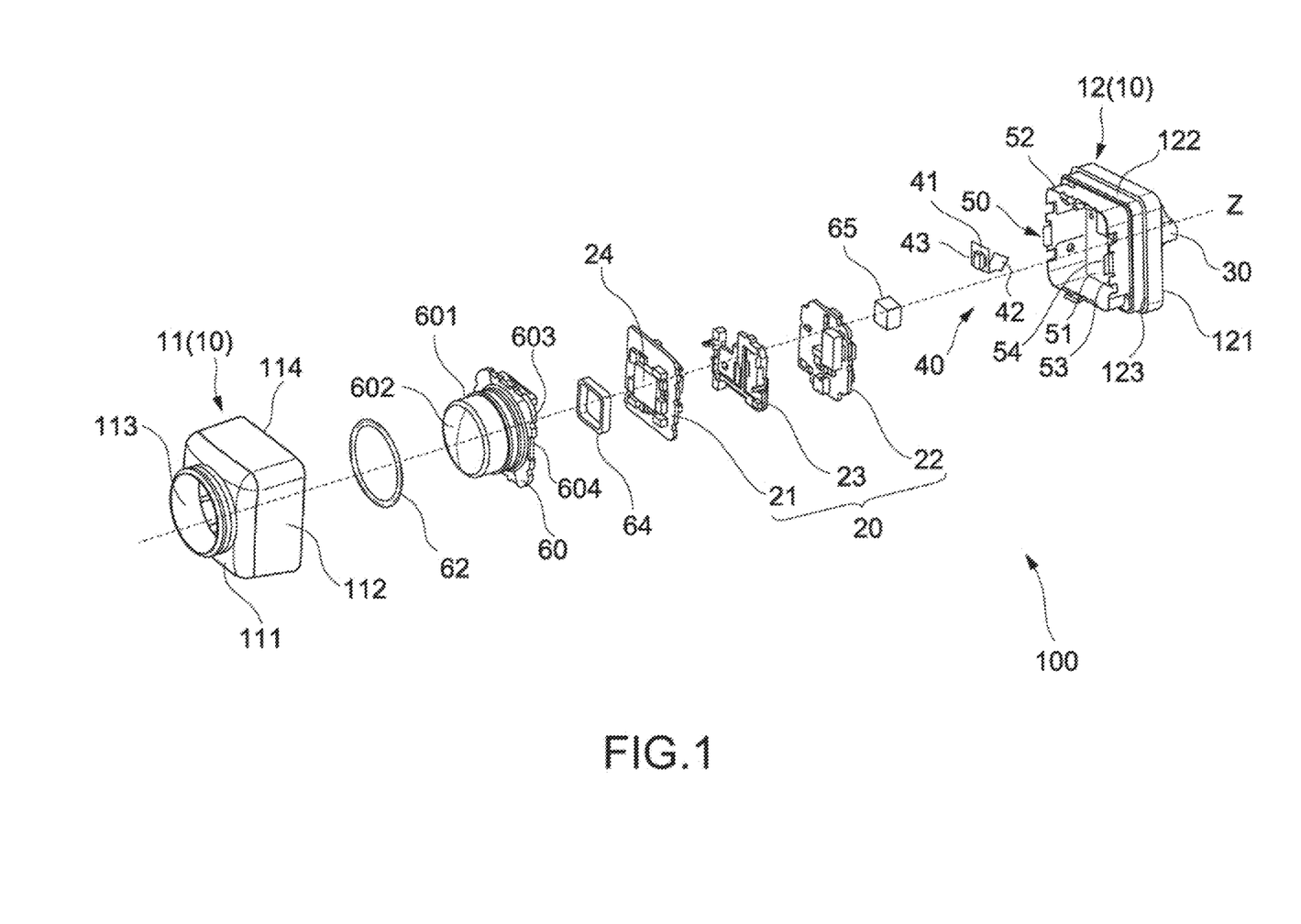
FIG. 1 is an exploded perspective view illustrating a configuration of a camera module according to a first embodiment of the present technology.
Figure 2:
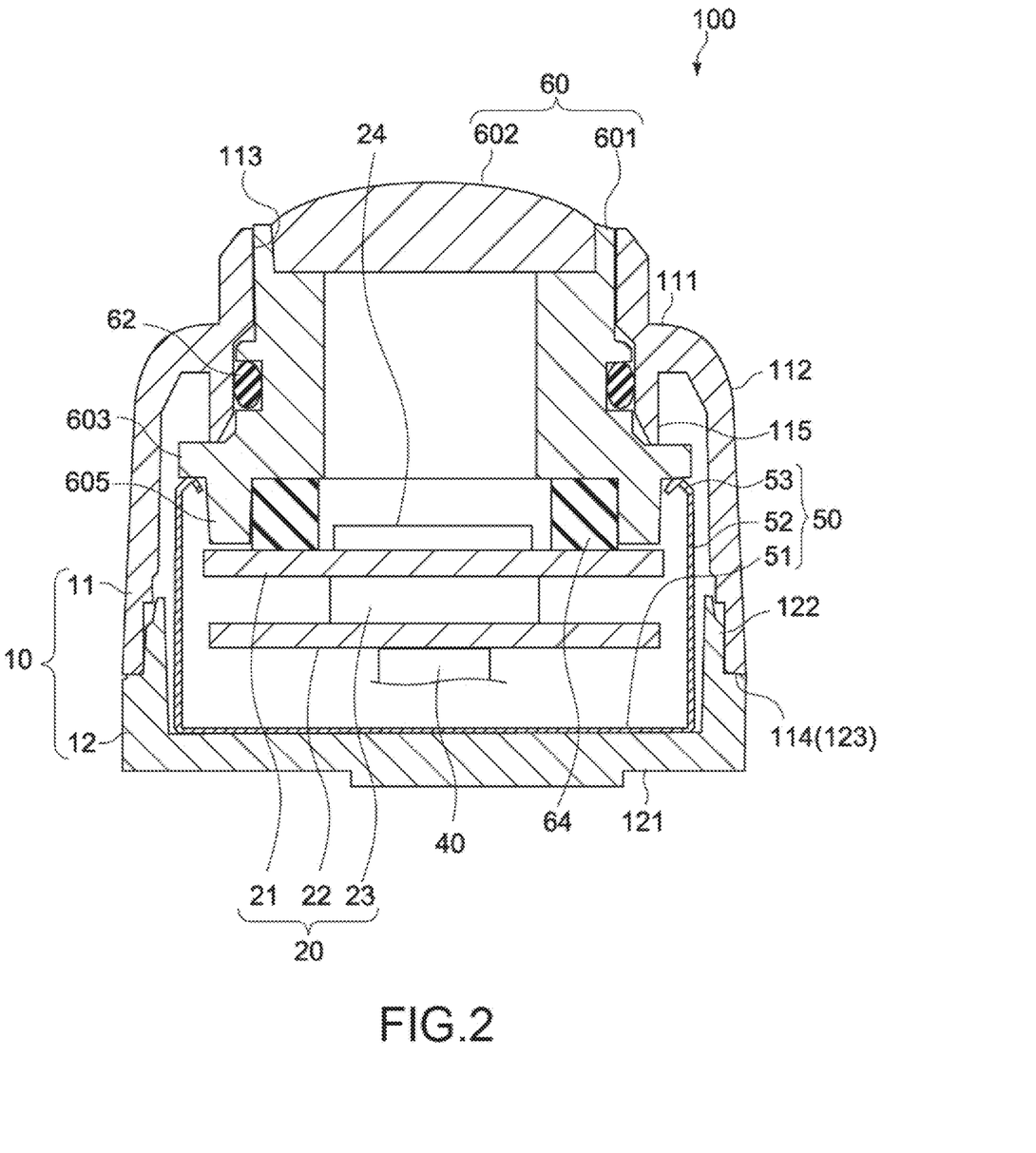
FIG. 2 is a schematic cross-sectional side view of the camera module.

FIG. 1 is an exploded perspective view illustrating a configuration of a camera module 100 according to an embodiment of the present technology, and FIG. 2 is a schematic cross-sectional side view of the camera module 100. The camera module 100 of the present embodiment is configured as a camera module used by being mounted on a vehicle.

The camera module 100 can be attached to a vehicle. For example, the camera module 100 is arranged outside of a vehicle body (an attachment target) (not illustrated), and captures an image of a region situated ahead of a vehicle, an image of a region situated behind the vehicle, or a region on a lateral side of the vehicle depending on an attachment position.

For example, the camera module 100 attached to a front portion (for example, a radiator grill) of a vehicle body captures an image of an environment ahead of the vehicle. Further, the camera module 100 attached to a rear portion (for example, above a license plate) of the vehicle body captures an image of an environment behind the vehicle. Furthermore, the camera module 100 attached to a side portion of the vehicle (for example, an upper portion of a pillar (an A-pillar, a B-pillar, or a pillar (a C-pillar, a D-pillar) situated in a rearmost portion of the vehicle, or a sideview mirror) captures an image of an environment in a lateral direction of the vehicle.

As illustrated in FIG. 1, the camera module 100 of the present embodiment includes, for example, a housing 10, a sensor board 20, a shield case 50, and a barrel member 60.

(Housing)

The housing 10 is configured by a front case 11 that is a first case, and a rear case 12 that is a second case being combined in a direction of an optical axis Z. Typically, the front case 11 and the rear case 12 are injection-molded bodies made of a synthetic resin material.

The front case 11 includes a front surface portion 111 that is formed substantially orthogonal to a front-rear direction (the direction of Z), and a lateral surface portion 112 that extends toward the rear case 12 from a peripheral edge of the front surface portion 111. In the present embodiment, the front surface portion 111 is substantially rectangular as viewed from the direction of the optical axis Z. The front case 11 is hollow, and a space portion that accommodates therein, for example, the sensor board 20 and the barrel member 61 is formed in a region surrounded by the front surface portion 111 and the lateral surface portion 112.

The front surface portion 111 of the front case 11 includes an opening 113 in a middle portion of the front surface portion 111. At an end of the lateral surface portion 112 that is situated on the side of the rear case 12, the front case 11 includes an opening end 114 that is welded to the rear case 12. The opening end 114 is formed to be substantially rectangular correspondingly to an outer shape of the front surface portion 111. Note that the front surface portion 111 and the opening end 114 are not limited to being rectangular, and may be formed into another shape, such as a circular shape or a triangular shape.

The rear case 12 is formed into a generally rectangular plate shape that includes a bottom surface portion 121 that is formed substantially orthogonal to the front-rear direction, and a lateral surface portion 122 that extends toward the front case 11 from a peripheral edge of the bottom surface portion 121. A space portion that accommodates therein, for example, the shield case 50 is formed in a region surrounded by the bottom surface portion 121 and the lateral surface portion 122. A substantially rectangular step portion 123 is formed between the bottom surface portion 121 and an outer peripheral surface of the lateral surface portion 122. The front case 11 and the rear case 12 are integrated with each other by the opening end 114 of the front case 11 being welded to the step portion 123. A welding method is not particularly limited, and, for example, ultrasonic welding or laser welding method can be applied.

(Barrel Member)

The barrel member 60 is arranged in the front case 11. The barrel member 60 includes a barrel 601 that is fitted into the opening 113 through a seal ring 62 in the direction of the optical axis Z. The barrel 601 is a cylindrical portion that supports an imaging lens 602, and protrudes forward of the front case 11 from the opening 113.

At an end of the barrel 601 that is situated on the side of the rear case 12, the barrel member 60 further includes a substantially rectangular flange 603 that protrudes outward. The flange 603 is a portion that is brought into contact with an elastic part 53 that is provided to an end of a peripheral wall portion 52 of the shield case 50. The peripheral wall portion 52 will be described later. Further, a notch 604 that is engaged with a positioning part 54 that is provided to the end of the peripheral wall portion 52 of the shield case 50 is provided to the flange 601, as illustrated in FIG. 1.

(Sensor Board)

The sensor board 20 is arranged in the housing 10. The sensor board 20 includes a front board 21 that faces the front surface portion 111 of the front case 11, a rear board 22 that faces the bottom surface portion 121 of the rear case 12, and a spacer 23 that is arranged between the front board 21 and the rear board 22.

The front board 21 and the rear board 22 are rigid double-sided circuit boards such as glass epoxy boards, and a facing distance between the boards is defined by the spacer 23. The front board 21 and the rear board 22 are mechanically and electrically connected to each other through a board connector (a B-to-B connector) (not illustrated). The sensor board 20 is not limited to being formed of two boards that are the front board 21 and the rear board 22, and may be formed of a single board.

An imaging device 24 is mounted on the front board 21 as a sensor element. The imaging device 24 is an image sensor such as a complementary metal-oxide semiconductor (CMOS) image sensor or a charge coupled device (CCD) image sensor. The front board 21 is joined to the barrel member 61 through a rectangularly annular cushion material 64, and the imaging device 24 is arranged to face the barrel 601.

As illustrated in FIG. 2, the cushion member 64 is arranged on an inner periphery of a rectangularly annular leg portion 605 that extends toward the sensor board 20 from the flange 603 of the barrel member 60. Upon joining the front case 11 and the rear case 12, the cushion member 64 stably holds a facing distance between the barrel 61 and the imaging device 24 when the sensor board 20 is pressed toward the barrel 61 due to compression being performed between the sensor board 20 and the bottom surface portion 121 of the rear case 12.

Further, through a flexible printed circuit 40, the rear board 22 is electrically connected to an external connector 30 that is provided to the bottom surface portion 121 of the rear case 12. A cushion member 65 (refer to FIG. 1) that biases the sensor board 20 toward the front case 11 and the barrel member 60 is arranged between the rear board 22 and the bottom surface portion 121 of the rear case 12.

(External Connector)

The external connector 30 is provided to the rear case 12. The external connector 30 is used to electrically connect the sensor board 20 and a vehicle body. Through the external connector 30, power is supplied from the vehicle body to the sensor board 20, and an image signal (an output signal of the imaging device 24) is transmitted from the sensor board 20 to the vehicle body.

Figure 3:
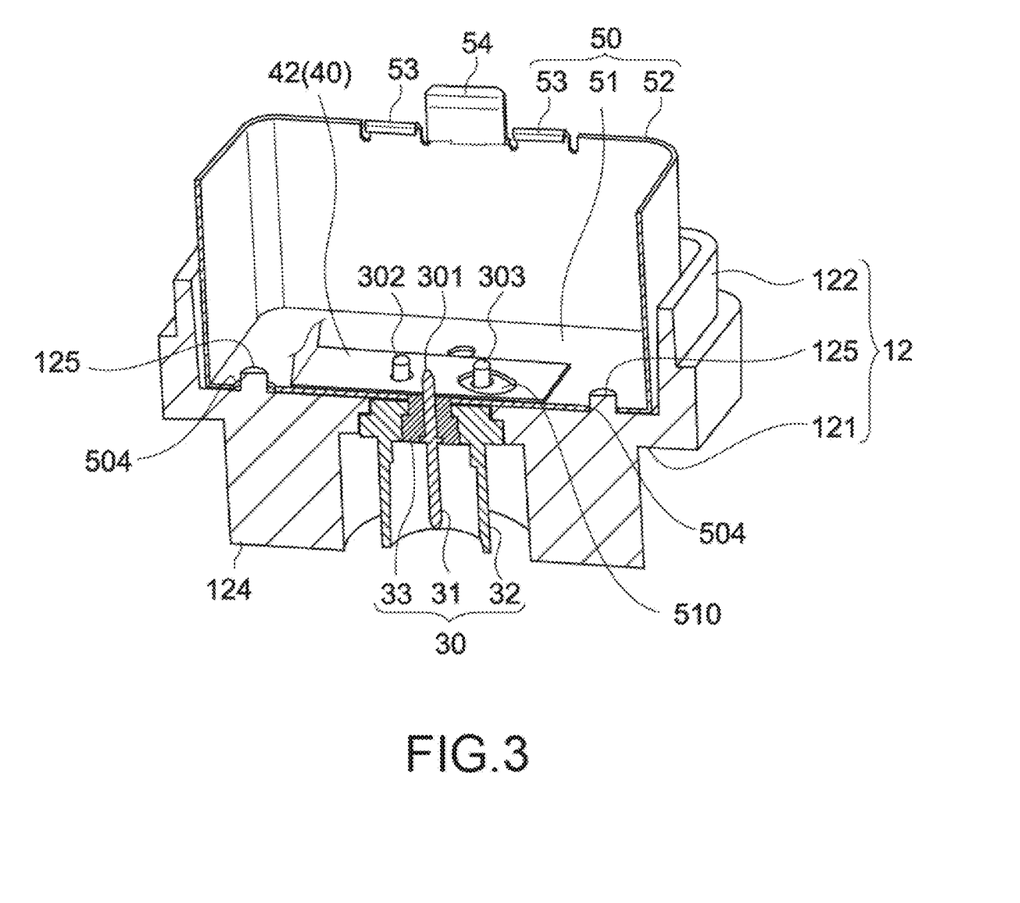
FIG. 3 is a cross-sectional perspective view of a primary portion on the side of a rear case of the camera module.

FIG. 3 is a cross-sectional perspective view of a primary portion of the rear case 12 that illustrates a configuration of the external connector 30.

As illustrated in FIG. 3, the external connector 30 includes a signal terminal 31 that is provided to the bottom surface portion 121 of the rear case 12, a cylindrical shield terminal 32 that is formed concentrically with the signal terminal 31, and an insulating member 33 that is arranged between the signal terminal 31 and the shield terminal 32. Each of the signal terminal 31 and the shield terminal 32 is made of a metallic material, and can be connected to a coaxial cable (not illustrated).

A cylindrical portion 124 that is concentric with the external connector 30 is provided to the bottom surface portion 121 of the rear case 12. The cylindrical portion 124 is used to protect the signal terminal 31 and the shield terminal 32 from the outside, and is formed outside of the external connector 30 to be concentric with the external connector 30.

The external connector 30 further includes a first connection pin 301, a second connection pin 302, and a third connection pin 303. The first connection pin 301 passes through the bottom surface portion 121 of the rear case 12, and is integrally formed at an end of the signal terminal 31. The second connection pin 302 and the third connection pin 303 pass through the bottom surface portion 121 of the rear case 12, and are integrally formed at an end of the shield terminal 32.

(Flexible Printed Circuit)

The flexible printed circuit 40 electrically connects the sensor board 20 and the external connector 30. The flexible printed circuit 40 is a circuit board obtained by routing a signal line and a ground line on a flexible base material such as polyimide. The signal line is wiring that carries an image signal coming from the sensor board 20, and the ground line is wiring that is connected to a ground line of the sensor board 20. When the sensor board 20 and the external connector 30 are connected to each other using the flexible printed circuit 40, this makes it possible to absorb variations (tolerances) in a distance between the sensor board 20 and the external connector 30, and thus to ensure the reliability in a stable electrical connection between them.

As illustrated in FIG. 1, the flexible printed circuit 40 includes a first base-material end 41 that is connected to the sensor board 20 (the rear board 22), and a second base-material end 42 that is connected to the external connector 30. The first base-material end 41 is connected to the rear board 22 through, for example, a connector member 43. The second base-material end 42 is connected to the external connector 30 using soldering.

The second base-material end 42 of the flexible printed circuit 40 includes lands that are respectively connected to the signal line and the ground line. The first connection pin 301 of the external connector 30 is soldered in a state of being inserted into the land connected to the signal line, and the second connection pin 302 of the external connector 30 is soldered in a state of being inserted into the land connected to the ground line (refer to FIG. 3).

The second base-material end 42 of the flexible printed circuit 40 further includes an opening 403 through which the third connection pin 303 of the external connector 30 passes (refer to FIG. 3). The opening 403 is a region in which a reservoir of a solder material used to join the third connection pin 303 to the shield case 50 is formed.

(Shield Case)

The shield case 50 is a substantially rectangular box body of which an end situated on the side of the front case 11 is open. The shield case 50 is typically made of a metallic material such as stainless steel or an aluminum alloy, and is one of components used for EMC measures taken to protect the sensor board 20 from electromagnetic noise.

The shield case 50 is arranged in the space portion formed by the bottom surface portion 121 and the lateral surface portion 122 of the rear case 12. The shield case 50 includes a bottom portion 51 that is arranged on the bottom surface portion 121 of the rear case 12, and the peripheral wall portion 52 covering around the sensor board 20.

As illustrated in FIG. 3, the bottom portion 51 of the shield case 50 is arranged between the second base-material end 42 of the flexible printed circuit 40 and the external connector 30. The bottom portion 51 is a substantially rectangular flat plate parallel to the bottom surface portion 121 of the rear case 12, and includes a plurality of through-holes, where the first to third connection pins 301 to 303 of the external connector 30 respectively pass through through-holes of the plurality of through-holes.

The peripheral wall portion 52 of the shield case 50 extends toward the front case 11 from a peripheral edge of the bottom portion 51 to form the space portion accommodating therein the sensor board 20. The elastic part 53 being brought into elastic contact with the flange 603 of the barrel member 60 and biasing the barrel member 60 toward the opening 113 of the front case 11 is provided to the end of the peripheral wall portion 52.

Figure 4:
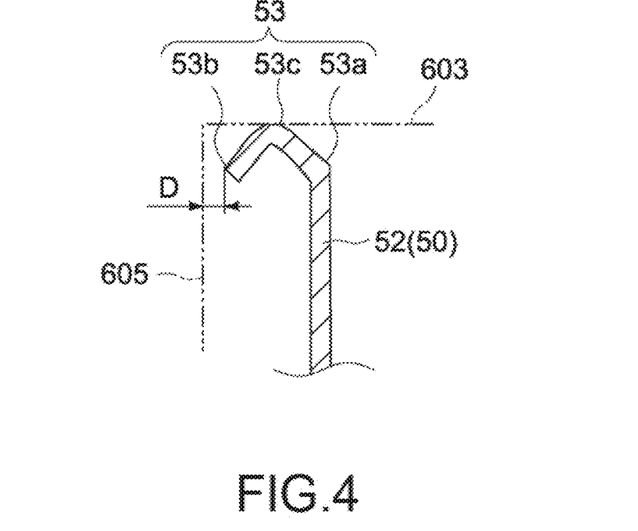
FIG. 4 is a schematic longitudinal cross-sectional view of a primary portion of a shield case included in the camera module.

FIG. 4 is a schematic longitudinal cross-sectional view of the elastic part 53. As illustrated in FIGS. 3 and 4, the elastic part 53 is a portion in the form of a plate of a specified width, and has an arch shape formed by the elastic part 53 being bent in stages inward of the shield case 50 from the end of the peripheral wall portion 52. The elastic part 53 includes a base end 53a, a control portion 53b, and an apex 53c. The base end 53a is a first stage portion that is provided to be continuous with the peripheral wall portion 52. The control portion 53b corresponds to a tip of the arch shape, and faces an outer peripheral surface of the leg portion 605 of the barrel member 60. The apex 53c corresponds to an apex of the arch shape, and is a second stage portion that is situated midway between the base end 53a and the tip 53b.

Due to the apex 53c of the elastic part 53 being brought into elastic contact with a back surface (a lower surface in FIG. 2) of the flange 603 of the barrel member 60, the elastic part 53 biases the barrel member 60 toward the front case 11 to determine a position of the barrel member 60 relative to the front case 11. In this case, the front case 11 may include a portion that is brought into contact with the barrel member 60 to define the position to be determined. In the present embodiment, for example, an end of a cylindrical portion 115 that supports an outer peripheral surface of the seal ring 62 is formed as a positioning portion that is brought into contact with a front surface (an upper surface in FIG. 2) of the flange 603 of the barrel member 60.

The elastic part 53 is provided to a plurality of locations at the end of the peripheral wall portion 52 of the shield case 50. In the present embodiment, the elastic part 53 is provided to locations that are included in a plurality of locations at the end of the peripheral wall portion 52 and situated across the sensor board 20 from each other. This makes it possible to stably support the barrel member 60, and thus to prevent the barrel member 60 from deviating from the imaging device 24 with respect to the optical axis.

In a state (hereinafter referred to as a first state) in which, as described above, the barrel member 60 is in position by the flange 603 of the barrel member 60 being brought into contact with the cylindrical portion 115 of the front case 11, the control portion 53b of the elastic part 53 is situated a distance D away from a lateral surface of the leg portion 605 of the barrel member 60 in a direction orthogonal to the optical-axis direction, as illustrated in FIG. 4.

The magnitude of the distance D is set such that tolerances in the dimensions of, for example, the front case 11, the rear case 12, and the barrel member 60 in the optical-axis direction can be absorbed upon assembling the housing 10 by the elastic part 53 being elastically deformed. In other words, the elastic part 53 of the shield case 50 includes a function of absorbing an error in assembling the camera module 100 in the optical-axis direction.

Further, in the camera module 100, the barrel member 60 can sink toward the rear case 12 according to an amount of an elastic deformation of the elastic part 53. Thus, the camera module 100 also includes a function of absorbing, by the elastic part 53 being elastically deformed, a stress applied to the barrel member 60 when an external force that causes the barrel member 60 to be pressed toward the rear case 12 acts, so as to protect the barrel 601 or the imaging lens 602 from the external force.

On the other hand, when an external force that causes the elastic part 53 to be greatly deformed beyond an elastic limit of the elastic part 53 acts, a plastic deformation occurs in the elastic part 53. This results in the barrel 61 being unable to return to the first state, and thus in a change in a position of the barrel member 60 in the housing 10 in the optical-axis direction. This may result in a significant reduction in the quality of a camera image (output of the imaging device 24) that is caused due to a reduction in the accuracy in the position of the barrel member 60.

In order to solve the issues described above, the elastic part 53 in the camera module 100 of the present embodiment includes the control portion 53b controlling approach of the barrel member 60 to the rear case 12 such that the barrel member 60 is at a distance greater than or equal to a specified distance from the rear case 12.

Details are described below.

Figure 5:
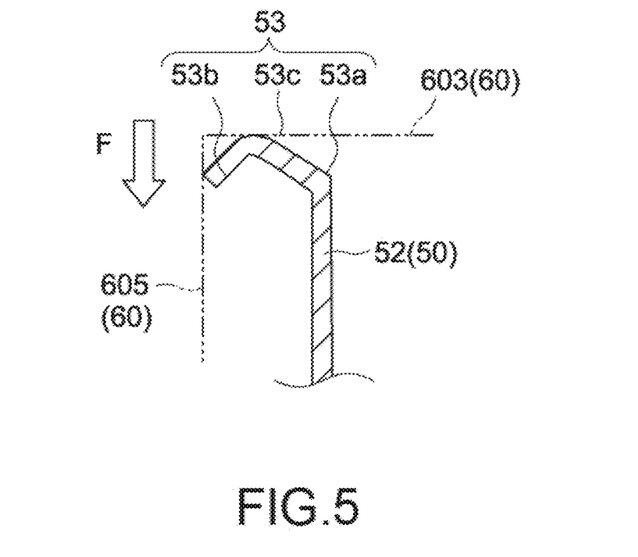
FIG. 5 is a schematic longitudinal cross-sectional view used to describe an action on the shield case.

In a state in which an external force that causes the barrel member 60 to be pressed toward the rear case 12 does not act (the first state), the apex 53c of the elastic part 53 is brought into elastic contact with the flange 603 of the barrel member 60, and the barrel member 60 is biased toward the front case 11, as illustrated in FIG. 4. When an external force F that causes the barrel member 60 to be pressed toward the rear case 12 acts from this state, a location, in the flange 603, at which the apex 53c supports the flange 603 is gradually shifted toward an inner periphery of the flange 603 as the shield case 50 of the elastic part 53 is elastically deformed. Consequently, the control portion 53b corresponding to the tip of the elastic part 53 approaches the leg portion 605 of the barrel member 60, and the control portion 53b is eventually brought into contact with the leg portion 605, as illustrated in FIG. 5. This state is hereinafter also referred to as a second state.

As described above, the elastic part 53 can be elastically deformed in a state between the first state in which the apex 53c is brought into contact with the flange 603 of the barrel member 60, and the second state in which the control portion 53b and the apex 53c are respectively brought into contact with the leg portion 605 and the flange 603 of the barrel member 60. In the second state, the control portion 53b is elastically pressed against the leg portion 605 in a direction orthogonal to the optical-axis direction. Consequently, the elastic part 53 is in the form of a clamp-clamp beam, with the base end 53a and the control portion 53b being fulcrums, and this results in greatly improving resistance to an external force that acts on the apex 53c. As described above, approach of the barrel member 60 to the rear case 12 is controlled such that the barrel member 60 is at a distance greater than or equal to a specified distance from the rear case 12.

Control of a deformation of the elastic part 53 that is performed by the control portion 53b may just prevent the deformation of the elastic part 53, or may restrict the deformation of the elastic part 53 to a degree less than or equal to a specified degree. In the second state, the apex 53c is deformed to a lesser extent or the deformation of the apex 53c is prevented due to the elastic part 53 being in the form of a clamp-clamp beam, as described above. This makes it possible to prevent the barrel member 60 from sinking excessively.

A shape, a position, a size, and the like of the control portion 53b are not particularly limited if it is possible for the control portion 53b to be brought into contact with the leg portion 605 of the barrel member 60 in the second state. A length from the apex 53c to the control portion 53b, an angle of bending to form a portion from the apex 53c to the control portion 53b, and the like can be set discretionarily according to, for example, a thickness, a shape, and an elastic modulus of the elastic part 53.

The elastic parts 53 respectively provided to locations of a plurality of locations at the end of the peripheral wall portion 52 of the shield case 50 are simultaneously subjected to the action described above. In the barrel member 60, the elastic parts 53 included in the plurality of elastic parts 53 and respectively provided to the locations of the plurality of locations in the flange 603 are simultaneously subjected to the action described above. Thus, the barrel member 60 is stably supported without being inclined with respect to the optical-axis direction. This makes it possible to improve the durability for an overload state while ensuring output of a high-quality camera image from the imaging device 24.

Second Embodiment

Figure 6:
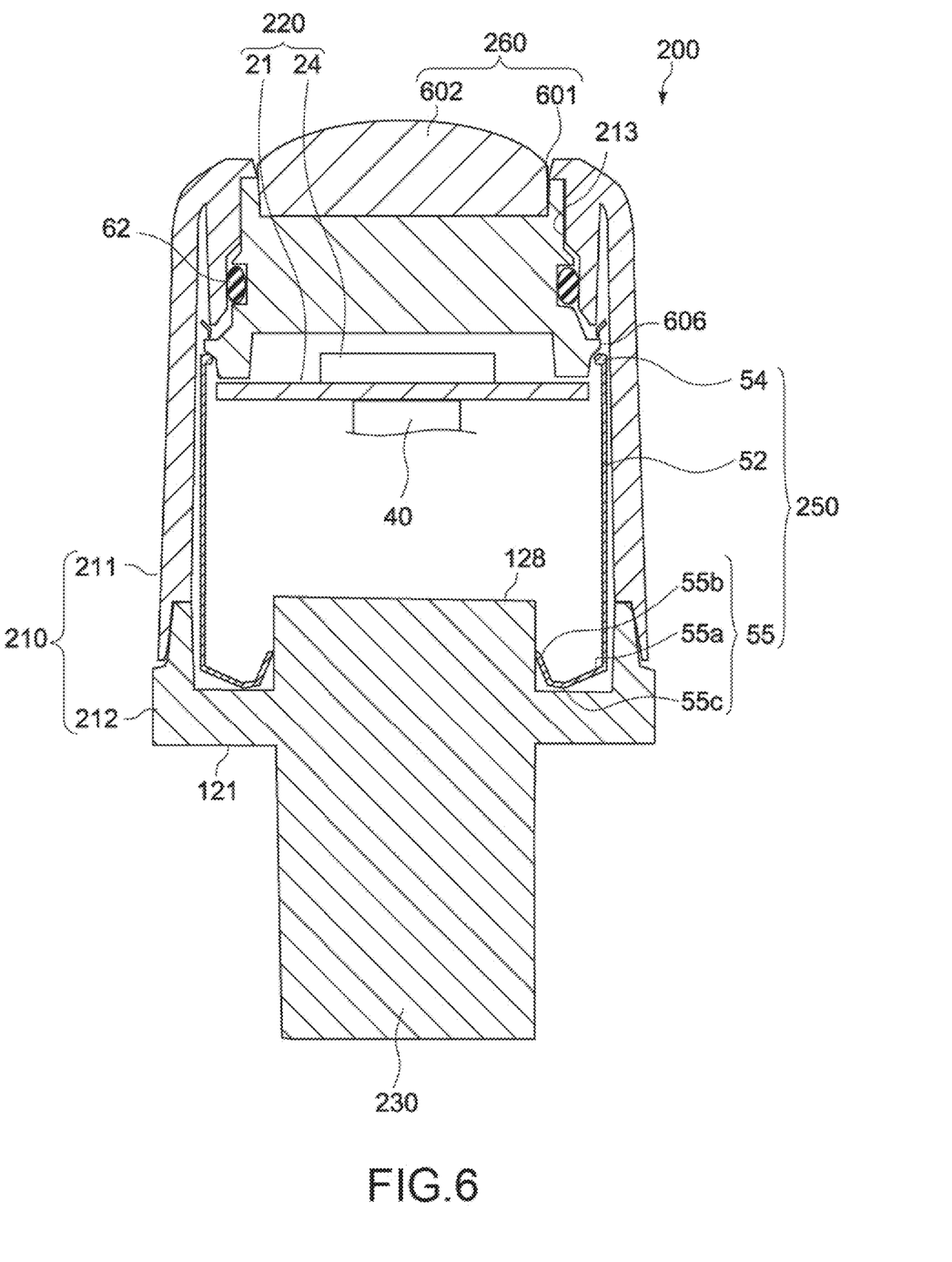
FIG. 6 is an exploded perspective view illustrating a configuration of a camera module according to a second embodiment of the present technology.

FIG. 6 is a schematic longitudinal cross-sectional view of a camera module 200 according to a second embodiment of the present technology. In the following description, a structural element that is different from the structural elements of the first embodiment is primarily described. A structural element that is similar to the structural element of the first embodiment is denoted by a reference numeral similar to the reference numeral used in the first embodiment, and a description thereof is omitted or simplified.

As in the first embodiment, the camera module 200 of the present embodiment includes, for example, a housing 210, a sensor board 220, a shield case 250, and a barrel member 260.

The housing 210 is configured by a front case 211 that is a first case, and a rear case 212 that is a second case being combined in the direction of the optical axis Z. Typically, the front case 211 and the rear case 212 are injection-molded bodies made of a synthetic resin material.

The front case 11 includes an opening 213 into which a barrel 601 of the barrel member 260 is fitted in the optical-axis direction. A space portion that accommodates therein, for example, the sensor board 220 and the shield case 250 is formed in the front case 11. The sensor board 220 is formed of only the first board 21 on which the imaging device 24 is mounted, but may be formed of two or more boards, as in the first embodiment.

An external connector 230 that is electrically connected to the sensor board 220 is provided to the rear case 212. The bottom surface portion 121 of the rear case 212 includes a protrusion 128 that protrudes toward the sensor board 220. The protrusion 128 is a cylindrical housing that accommodates therein a plurality of connection pins respectively connected to a signal terminal and a shield terminal (not illustrated) of the external connector 230.

Note that, for example, illustrations of cushion materials that are respectively arranged between the barrel member 260 and the sensor board 220 and between the sensor board 220 and the rear case 212 are omitted here.

The shield case 250 includes the peripheral wall portion 52 covering around the sensor board 20. The shield case 250 of the present embodiment has a shape of a rectangular tube of which both ends are open. The shield case 50 is typically made of a metallic material such as stainless steel or an aluminum alloy, and is one of components used for EMC measures taken to protect the sensor board 20 from electromagnetic noise.

An engagement part 54 that is engaged with an engagement portion 606 that is provided to a specified location on an outer peripheral surface of the barrel member 260 is provided to one of ends of the peripheral wall portion 52 (an upper end in FIG. 6). An elastic part 55 that is brought into elastic contact with a peripheral surface of the protrusion 128 of the rear case 212, and biases the barrel member 260 toward the opening 213 of the front case 211, is provided to another of the ends of the peripheral wall portion 52 (a lower end in FIG. 6). The elastic part 55 is typically provided to locations that are included in a plurality of locations at the end of the peripheral wall portion 52 and situated across the sensor board 220 from each other.

Figure 7:
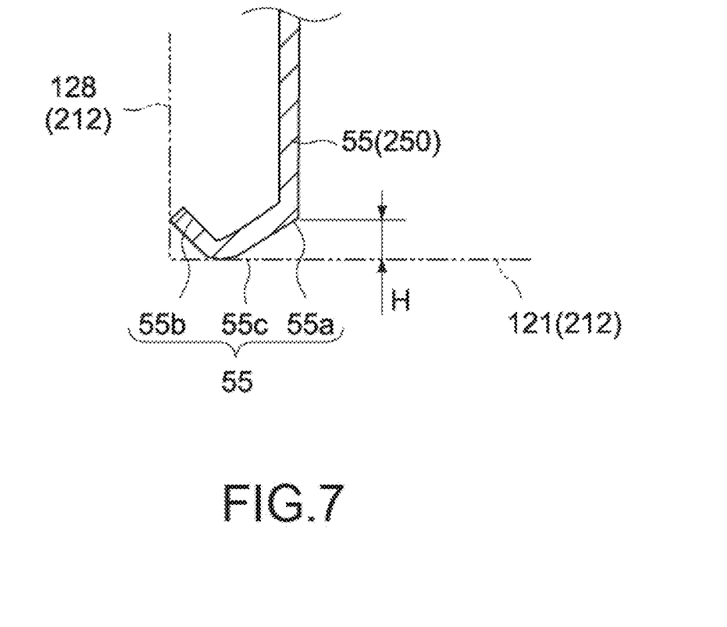
FIG. 7 is a schematic longitudinal cross-sectional view of a primary portion of a shield case included in the camera module.

FIG. 7 is a schematic longitudinal cross-sectional view of the elastic part 55. As in the first embodiment, the elastic part 55 is a portion in the form of a plate of a specified width, and has an arch shape by the elastic part 55 being bent in stages inward of the shield case 250 from the end of the peripheral wall portion 52. The elastic part 55 includes a control portion 55a, a tip 55b, and an apex 55c. The control portion 55a corresponds to a base end of the arch shape, and is a first stage portion that is provided to be continuous with the peripheral wall portion 52. The tip 55b corresponds to a tip of the arch shape, and faces a lateral surface of the protrusion 128 of the rear case 212. The apex 55c corresponds to an apex of the arch shape, and is a second stage portion that is situated midway between the control portion 55a and the tip 55b.

The tip 55b of the elastic part 55 is brought into elastic contact with the protrusion 128 of the rear case 212 to hold the protrusion 128 from the lateral surface of the protrusion 128. This results in obtaining a function of temporarily fixing the shield case 250 to the rear case 212. For example, the function has the advantage of preventing the shield case from falling off the rear case 212 when the rear case 212 is assembled to the front case 211 from above.

As illustrated in FIG. 6, due to the apex 53c of the elastic part 55 being brought into elastic contact with the bottom surface portion 121 of the rear case 212, the elastic part 55 biases the barrel member 260 toward the front case 211 to determine a position of the barrel member 260 relative to the front case 211. In a state (hereinafter referred to as a first state) in which the barrel member 260 is in position, the control portion 55a of the elastic part 55 is situated a distance H away from the bottom surface portion 121 of the rear case 212 in the optical-axis direction, as illustrated in FIG. 7.

The magnitude of the distance H is set such that tolerances in the dimensions of, for example, the front case 211, the rear case 212, and the barrel member 260 in the optical-axis direction can be absorbed upon assembling the housing 210 by the elastic part 55 being elastically deformed. In other words, the elastic part 55 of the shield case 250 includes a function of absorbing an error in assembling the camera module 200 in the optical-axis direction.

Further, in the camera module 200, the barrel member 260 can sink toward the rear case 212 according to an amount of an elastic deformation of the elastic part 55. Thus, the camera module 200 also includes a function of absorbing, by the elastic part 55 being elastically deformed, a stress applied to the barrel member 260 when an external force that causes the barrel member 260 to be pressed toward the rear case 12 acts, so as to protect the barrel 601 or the image-capturing lens 602 from the external force.

On the other hand, when an external force that causes the elastic part 55 to be greatly deformed beyond an elastic limit of the elastic part 55 acts, a plastic deformation occurs in the elastic part 55. This results in the barrel member 260 being unable to return to the first state, and thus in a change in a position of the barrel member 260 in the housing 210 in the optical-axis direction. This may result in a significant reduction in the quality of a camera image (output of the imaging device 24) that is caused due to a reduction in the accuracy in the position of the barrel member 260.

In order to solve the issues described above, the elastic part 55 in the camera module 200 of the present embodiment includes the control portion 55a controlling approach of the barrel member 260 to the rear case 212 such that the barrel member 260 is at a distance greater than or equal to a specified distance from the rear case 212.

Details are described below.

Figure 8:
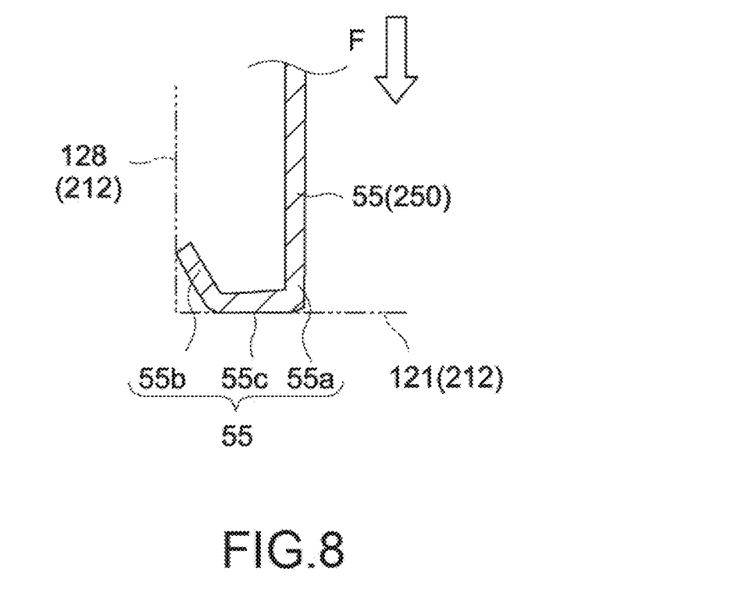
FIG. 8 is a schematic longitudinal cross-sectional view used to describe an action on the shield case.

In a state in which an external force that causes the barrel member 260 to be pressed toward the rear case 212 does not act (the first state), the tip 55b and the apex 55c of the elastic part 55 are respectively brought into elastic contact with the lateral surface of the protrusion 128 of and the bottom surface portion 121 of the rear case 212, and the barrel member 260 is biased toward the front case 211, as illustrated in FIG. 7. When an external force F that causes the barrel member 260 to be pressed toward the rear case 212 acts from this state, the control portion 55a corresponding to the base end of the elastic part 55 approaches the bottom surface portion 121 of the rear case 212 as the shield case 50 of the elastic part 55 is elastically deformed. The control portion 55a is eventually brought into contact with the bottom surface portion 121, as illustrated in FIG. 8. This state is hereinafter also referred to as a second state.

As described above, the elastic part 55 can be elastically deformed in a state between the first state in which the tip 55b and the apex 55c are brought into contact with the rear case 212, and the second state in which all of the tip 55b, the apex 55c, and the control portion 55a are brought into contact with the rear case 212.

Consequently, approach of the barrel member 60 to the rear case 12 is controlled such that the barrel member 60 is at a distance greater than or equal to a specified distance from the rear case 12.

A shape, a position, a size, and the like of the control portion 55a are not particularly limited if it is possible for the control portion 55a to be brought into contact with the bottom surface portion 121 of the rear case 212 in the second state. A length from the control portion 55a to the apex 55c, an angle of bending to form a portion from the control portion 55a to the apex 55c, and the like can be set discretionarily according to, for example, a thickness, a shape, and an elastic modulus of the elastic part 55.

Modifications

The technology according to the present disclosure can be applied to various products. For example, the technology according to the present disclosure may be provided as a sensor module that is mounted on one of the types of mobile bodies such as vehicle, electric vehicle, hybrid electric vehicle, motorcycle, bicycle, personal mobility, airplane, drone, ship, robot, construction machinery, and agricultural machinery (tractor).

Note that the present technology may also take the following configurations.

(1) A camera module, including:
a housing that includes a first case that includes an opening, and a second case that is joined to the first case;
a barrel member that is arranged in the first case, and includes a barrel that is fitted into the opening in an optical-axis direction;
a sensor board that is arranged in the housing and includes an imaging device that faces the barrel member; and
a metallic shield case that is arranged between the barrel member and the second case, the shield case including a peripheral wall portion that covers around the sensor element, and an elastic part that is provided to an end of the peripheral wall portion and biases the barrel member toward the opening, the elastic part including a control portion that controls approach of the barrel member to the second case such that the barrel member is at a distance greater than or equal to a specified distance from the second case.

(2) The camera module according to (1), in which
the elastic part has an arch shape formed by the elastic part being bent in stages inward of the shield case from the end of the peripheral wall portion, and
the control portion is a tip or a base end of the arch shape.

(3) The camera module according to (2), in which
the control portion is the tip of the arch shape, and
the elastic part is provided to the end of the peripheral wall portion, which is situated on a side of the barrel member,
the elastic part is elastically deformable in a state between a first state in which an apex of the arch shape is brought into contact with the barrel member, and a second state in which the tip and the apex of the arch shape are brought into contact with the barrel member, and
in the second state, the elastic part controls the approach of the barrel member to the second case such that the barrel member is at the distance greater than or equal to the specified distance from the second case.

(4) The camera module according to (3), in which
the barrel member further includes a flange with which the elastic part is brought into contact, and a leg portion that extends toward the sensor board from the flange, and
in the second state, the tip of the arch shape of the elastic part is brought into contact with the leg portion.

(5) The camera module according to (2), in which
the control portion is the base end of the arch shape, and
the elastic part is provided to the end of the peripheral wall portion, which is situated on a side of the second case,
the elastic part is elastically deformable in a state between a first state in which the tip and an apex of the arch shape are brought into contact with the second case, and a second state in which the tip, the apex, and the base end of the arch shape are brought into contact with the second case, and
in the second state, the elastic part controls the approach of the barrel member to the second case such that the barrel member is at the distance greater than or equal to the specified distance from the second case.

(6) The camera module according to (5), in which
the second case includes a bottom surface portion, and a protrusion that extends toward the sensor board from the bottom surface portion, in the first state, the tip and the apex of the arch shape of the elastic part are respectively brought into elastic contact with a lateral surface of the protrusion and the bottom surface portion, and in the second state, the base end of the arch shape of the elastic part is brought into contact with the bottom surface portion.

(7) The camera module according to any one of (1) to (6), in which the elastic part is provided to a plurality of locations at the end of the peripheral wall portion.

(8) The camera module according to (7), in which the elastic part is provided to locations that are included in the plurality of locations at the end of the peripheral wall portion and situated across the sensor board from each other.

(9) The camera module according to any one of (1) to (8), further including an external connector that is provided to the second case and electrically connected to the sensor board.

(10) The camera module according to any one of (1) to (9), in which the camera module is attachable to a vehicle.

REFERENCE SIGNS LIST 10, 210 housing
11, 211 front case (first case)
12, 212 rear case (second case)
20, 220 sensor board
24. imaging device
30, 230 external connector
40 flexible printed circuit
50, 250 shield case
53, 55 elastic part
53b, 55a control portion
60, 260 barrel member
100 camera module
601 barrel

The invention claimed is:

1. A camera module, comprising:
a housing that includes a first case that includes an opening, and a second case that is joined to the first case;
a barrel member that is arranged in the housing, and includes a barrel that is fitted into the opening in an optical-axis direction;
a sensor board that is arranged in the housing and includes an imaging device that faces the barrel member; and
a metallic shield case that is arranged between the barrel member and the second case, the shield case including a peripheral wall portion that covers around the sensor element, and an elastic part that is provided to an end of the peripheral wall portion and biases the barrel member toward the opening, the elastic part including a control portion that controls approach of the barrel member to the second case such that the barrel member is at a distance greater than or equal to a specified distance from the second case.

2. The camera module according to claim 1, wherein
the elastic part has an arch shape formed by the elastic part being bent in stages inward of the shield case from the end of the peripheral wall portion, and
the control portion is a tip or a base end of the arch shape.

3. The camera module according to claim 2, wherein
the control portion is the tip of the arch shape, and
the elastic part is provided to the end of the peripheral wall portion, which is situated on a side of the barrel member,
the elastic part is elastically deformable in a state between a first state in which an apex of the arch shape is brought into contact with the barrel member, and a second state in which the tip and the apex of the arch shape are brought into contact with the barrel member, and
in the second state, the elastic part controls the approach of the barrel member to the second case such that the barrel member is at the distance greater than or equal to the specified distance from the second case.

4. The camera module according to claim 3, wherein
the barrel member further includes a flange with which the elastic part is brought into contact, and a leg portion that extends toward the sensor board from the flange, and
in the second state, the tip of the arch shape of the elastic part is brought into contact with the leg portion.

5. The camera module according to claim 2, wherein
the control portion is the base end of the arch shape, and
the elastic part is provided to the end of the peripheral wall portion, which is situated on a side of the second case,
the elastic part is elastically deformable in a state between a first state in which the tip and an apex of the arch shape are brought into contact with the second case, and a second state in which the tip, the apex, and the base end of the arch shape are brought into contact with the second case, and
in the second state, the elastic part controls the approach of the barrel member to the second case such that the barrel member is at the distance greater than or equal to the specified distance from the second case.

6. The camera module according to claim 5, wherein
the second case includes a bottom surface portion, and a protrusion that extends toward the sensor board from the bottom surface portion,
in the first state, the tip and the apex of the arch shape of the elastic part are respectively brought into elastic contact with a lateral surface of the protrusion and the bottom surface portion, and
in the second state, the base end of the arch shape of the elastic part is brought into contact with the bottom surface portion.

7. The camera module according to claim 1, wherein
the elastic part is provided to a plurality of locations at the end of the peripheral wall portion.

8. The camera module according to claim 7, wherein
the elastic part is provided to locations that are included in the plurality of locations at the end of the peripheral wall portion and situated across the sensor board from each other.

9. The camera module according to claim 1, further comprising
an external connector that is provided to the second case and electrically connected to the sensor board.

10. The camera module according to claim 1, wherein
the camera module is attachable to a vehicle.

* * * * *